(12) United States Patent
Fattal

(10) Patent No.: US 10,484,674 B2
(45) Date of Patent: Nov. 19, 2019

(54) SUPERSAMPLED 3D DISPLAY WITH IMPROVED ANGULAR RESOLUTION

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 97 days.

(21) Appl. No.: 15/755,696

(22) PCT Filed: Jul. 25, 2016

(86) PCT No.: PCT/US2016/043937
§ 371 (c)(1),
(2) Date: Feb. 27, 2018

(87) PCT Pub. No.: WO2017/039876
PCT Pub. Date: Mar. 9, 2017

(65) Prior Publication Data
US 2018/0262751 A1 Sep. 13, 2018

Related U.S. Application Data

(60) Provisional application No. 62/214,971, filed on Sep. 5, 2015.

(51) Int. Cl.
*H04N 13/349* (2018.01)
*H04N 13/351* (2018.01)
(Continued)

(52) U.S. Cl.
CPC ......... *H04N 13/349* (2018.05); *G02B 5/1866* (2013.01); *G02B 6/0018* (2013.01);
(Continued)

(58) Field of Classification Search
CPC combination set(s) only.
See application file for complete search history.

(56) References Cited

U.S. PATENT DOCUMENTS 9,201,270 B2  12/2015  Fattal et al.
9,298,168 B2   3/2016  Taff et al.
(Continued)

OTHER PUBLICATIONS

International Search Report and Written Opinion (ISRWO), 11 pages, from KIPO (ISA/KR), dated Nov. 1, 2016, for counterpart parent PCT patent application No. PCT/US2016/043937.
(Continued)

*Primary Examiner* — Alexander Gee
(74) *Attorney, Agent, or Firm* — J. Michael Johnson

(57) ABSTRACT

In a supersampling technique, an adjacent pair of pixels in a three-dimensional (3D) electronic display is driven based on angular combinations. In particular, a pixel in the pair is driven by an angular combination of a pixel in a 3D view of a 3D image and at least one product of a pixel in an intermediate 3D view and an associated weight. Moreover, the 3D views applied to the pair have different associated angular ranges with different principal angular directions, and the intermediate 3D view has an associated intermediate angular range with an intermediate principal angular direction that is between the principal angular directions. When viewing the 3D electronic display along a principal angular direction in the principal directions of the 3D view, a viewer sees the 3D view, and when viewing the 3D electronic display along the intermediate principal angular direction, the viewer sees the intermediate 3D view.

21 Claims, 10 Drawing Sheets

(51) Int. Cl.
  *H04N 13/111* (2018.01)
  *F21V 8/00* (2006.01)
  *G02B 27/42* (2006.01)
  *H04N 13/324* (2018.01)
  *G02B 5/18* (2006.01)
  *H04N 13/32* (2018.01)
  *G02B 27/44* (2006.01)

(52) U.S. Cl.
  CPC ......... *G02B 6/0021* (2013.01); *G02B 6/0031* (2013.01); *G02B 6/0036* (2013.01); *G02B 6/0038* (2013.01); *G02B 6/0068* (2013.01); *G02B 27/425* (2013.01); *G02B 27/44* (2013.01); *H04N 13/111* (2018.05); *H04N 13/32* (2018.05); *H04N 13/324* (2018.05); *H04N 13/351* (2018.05)

(56) References Cited

U.S. PATENT DOCUMENTS

| | | | |
|---|---|---|---|
| 9,389,415 B2 | 7/2016 | Fattal et al. | |
| 9,459,461 B2 | 10/2016 | Santori et al. | |
| 9,557,466 B2 | 1/2017 | Fattal | |
| 2003/0026474 A1* | 2/2003 | Yano | G02B 27/2214 382/154 |
| 2005/0001787 A1* | 1/2005 | Montgomery | G09G 3/003 345/6 |
| 2006/0023065 A1* | 2/2006 | Alden | H04N 5/44591 348/51 |
| 2008/0204663 A1 | 8/2008 | Balogh | |
| 2009/0091613 A1* | 4/2009 | Louwsma | G02B 27/2214 348/51 |
| 2010/0066817 A1* | 3/2010 | Zomet | G03B 25/02 348/51 |
| 2011/0109629 A1 | 5/2011 | Ericson et al. | |
| 2012/0176665 A1 | 7/2012 | Song et al. | |
| 2013/0242062 A1* | 9/2013 | Ming | G03B 35/24 348/51 |
| 2014/0340402 A1* | 11/2014 | Hamagishi | G02B 27/2264 345/426 |
| 2015/0036068 A1 | 2/2015 | Fattal et al. | |
| 2015/0049176 A1 | 2/2015 | Hinnen et al. | |
| 2015/0085073 A1* | 3/2015 | Bruls | H04N 13/144 348/43 |
| 2015/0092030 A1* | 4/2015 | Lee | G02B 27/2214 348/59 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

* cited by examiner

US 10,484,674 B2

SUPERSAMPLED 3D DISPLAY WITH IMPROVED ANGULAR RESOLUTION

CROSS-REFERENCE TO RELATED APPLICATIONS

This application is a U. S. national stage patent application filed under 35 U.S.C. § 371 and claims the benefit of priority to International Patent Application No. PCT/US2016/043937, filed Jul. 25, 2016, which claims priority to U.S. Provisional Patent Application Ser. No. 62/214,971, filed Sep. 5, 2015, both of which are incorporated by reference in their entirety herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the applicability limitations of passive displays associated with light emission, many passive displays are coupled to an external light source. The coupled light source may allow these otherwise passive displays to emit light and function substantially as an active display. Examples of such coupled light sources are backlights. Backlights are light sources (often so-called 'panel' light sources) that are placed behind an otherwise passive display to illuminate the passive display. For example, a backlight may be coupled to an LCD or an EP display. The backlight emits light that passes through the LCD or the EP display. The light emitted by the backlight is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
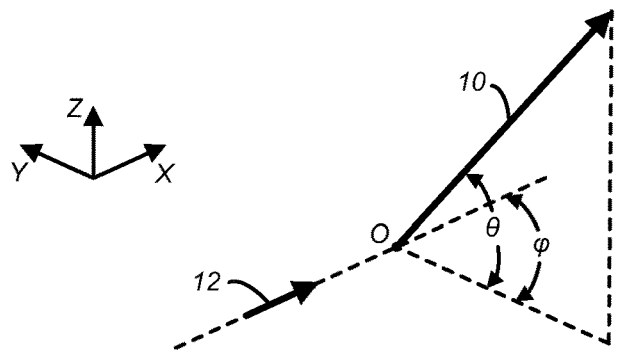
FIG. 1 illustrates a graphical view of angular components $\{\theta, \phi\}$ of a light beam having a particular principal angular direction, according to an example of the principles describe herein.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide supersampling by driving an adjacent pair of pixels in a three-dimensional (3D) electronic display based on angular combinations. In particular, a pixel in the pair of pixels is driven by an angular combination in the angular combinations of a pixel in a 3D view of a 3D image and at least one product of a pixel in an intermediate 3D view and an associated weight. Moreover, the 3D views applied to the pair of pixels have different associated angular ranges with different principal angular directions, and the intermediate 3D view has an associated intermediate angular range with an intermediate principal angular direction that is between the principal angular directions. When viewing the 3D electronic display along a principal angular direction in the principal directions of the 3D view, a viewer sees the 3D view, and when viewing the 3D electronic display along the intermediate principal angular direction, the viewer sees the intermediate 3D view. Thus, by including the intermediate 3D view, the angular sampling associated with the 3D views is increased, thereby increasing the angular resolution of the 3D electronic display and smoothing transitions between the 3D views of the 3D image that are provided by the 3D electronic display.

Moreover, in some embodiments the 3D electronic display is used to display 3D information, e.g., an autostereoscopic or 'glasses free' 3D electronic display.

In particular, a 3D electronic display may employ a grating-based backlight having an array of multibeam diffraction gratings. The multibeam diffraction gratings may be used to couple light from a light guide and to provide coupled-out light beams corresponding to pixels of the 3D electronic display. The coupled-out light beams may have different principal angular directions (also referred to as 'differently directed light beams') from one another. According to some embodiments, these differently directed light beams produced by the multibeam diffraction gratings may be modulated and serve as 3D pixels corresponding to 3D views of the 'glasses free' 3D electronic display to display 3D information.

In these embodiments, because of the finite number of principal angular directions, the angular resolution of the 3D electronic display can be increased by driving adjacent 3D pixels with angular combinations of the 3D views and the weighted intermediate 3D views. Because of the logarithmic-scale nonlinearity of the human visual system, when viewed along a particular principal angular direction in the principal angular directions, the intermediate 3D views do not have an appreciable effect (i.e., a viewer sees the 3D view of the 3D image having the principal angular direction, which has the largest intensity). However, as the viewing angle changes (and crosses a boundary of the angular range associated with the 3D view), and the viewer is between principal angular directions associated with adjacent 3D views of the 3D image, the viewer will see or perceive an intermediate 3D view. These transitions may occur smoothly, transitioning from a 3D view of the 3D image having the principal angular direction, then to the intermediate 3D view of the 3D image having an intermediate principal angular direction, and then to another 3D view of the 3D image having another principal angular direction. Consequently, the supersampling technique may smooth transitions between the 3D views of the 3D image that are provided by the 3D electronic display.

Note that there may be sixty four (64) 3D views of the 3D image and, by driving the adjacent pairs of pixels with the angular combinations that include the intermediate 3D views, the angular resolution of the 3D electronic display can be increased by a factor of $\sqrt{2}$, so that there are effectively one hundred and twenty eight (128) 3D views of the 3D image. For example, the intermediate 3D view may be along a diagonal direction of the 3D electronic display, and the intermediate 3D view may be included in the angular combinations that are driven on a group of four adjacent pairs of pixels in the 3D electronic display. In these embodiments, the weight used in the pairs of pixels is one quarter.

Alternatively, there may be sixty four (64) 3D views of the image and, by driving the adjacent pairs of pixels with the angular combinations that include the intermediate 3D views, the angular resolution of the 3D electronic display can be increased by a factor of two (2), so that there are effectively two hundred and fifty six (256) 3D views of the 3D image. For example, the intermediate 3D view may be along a horizontal or a vertical direction of the 3D electronic display, and the intermediate 3D view may be included in the angular combinations that are driven on an adjacent pair of pixels in the 3D electronic display. Moreover, the intermediate 3D view may be along a diagonal direction of the 3D electronic display, and the intermediate 3D view may be included in the angular combinations that are driven on a group of four adjacent pairs of pixels in the 3D electronic display. In these embodiments, the weight used in the pairs of pixels is one half (0.5) along the horizontal or the vertical direction, and one quarter (0.25) along the diagonal direction.

Herein a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

In particular, a light beam produced by the multibeam diffraction grating has a principal angular direction given by angular components $\{\theta, \phi\}$, by definition herein. The angular component $\theta$ is referred to herein as the 'elevation component' or 'elevation angle' of the light beam. The angular component is referred to as the 'azimuth component' or 'azimuth angle' of the light beam. By definition, the elevation angle $\theta$ is an angle in a vertical plane (e.g., perpendicular to a plane of the multibeam diffraction grating) while the azimuth angle $\phi$ is an angle in a horizontal plane (e.g., parallel to the multibeam diffraction grating plane). FIG. 1 illustrates the angular components $\{\theta, \phi\}$ of a light beam 10 having a particular principal angular direction, according to an example of the principles describe herein. In addition, the light beam 10 is emitted or emanates from a particular point, by definition herein. That is, by definition, the light beam 10 has a central ray associated with a particular point of origin within the multibeam diffraction grating. FIG. 1 also illustrates the light beam point of origin O. An example propagation direction of incident light is illustrated in FIG. 1 using a bold arrow 12 directed toward the point of origin O.

According to various embodiments, characteristics of the multibeam diffraction grating and features (i.e., diffractive features) thereof, may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove width or ridge width), and an orientation of the grating. In some examples, the various characteristics used for control may be characteristics that are local to a vicinity of the point of origin of a light beam.

Further according to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent '3D pixels' of the 3D electronic display. Further, the 3D pixels correspond to different 3D views or 3D view angles of the 3D electronic display.

Moreover, a 'collimator' is defined as structure that transforms light entering the collimator and into collimated light at an output of the collimator that has a degree of collimation. In particular the collimator may reflect, refract or reflect and refract input light into a collimated output beam along a particular direction. In some embodiments, the collimator may be configured to provide collimated light having a predetermined, non-zero propagation angle in a vertical plane corresponding to the vertical direction or equivalently with respect to a horizontal plane. According to some embodiments, the light source may include different optical sources (such as different LEDs) that provide different colors of light, and the collimator may be configured to provide collimated light at different, color-specific, non-zero propagation angles corresponding to each of the different colors of the light.

Herein, a 'light source' is defined as a source of light (e.g., an apparatus or device that emits light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., produce a color of light that is different between the at least two light sources). Hence, by definition herein, a plurality of light sources of different colors may include a first light source that produces a first color of light and a second light source that produces a second color of light, where the second color differs from the first color.

Moreover, a 'pixel' in a 3D view or 3D image may be defined as a minute area in a 3D view or a 3D image. Thus, the 3D image may include multiple pixels. Alternatively, a 'pixel' in a 3D electronic display may be defined as a minute area of illumination in the 3D electronic display, such as a cell in a liquid crystal display.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
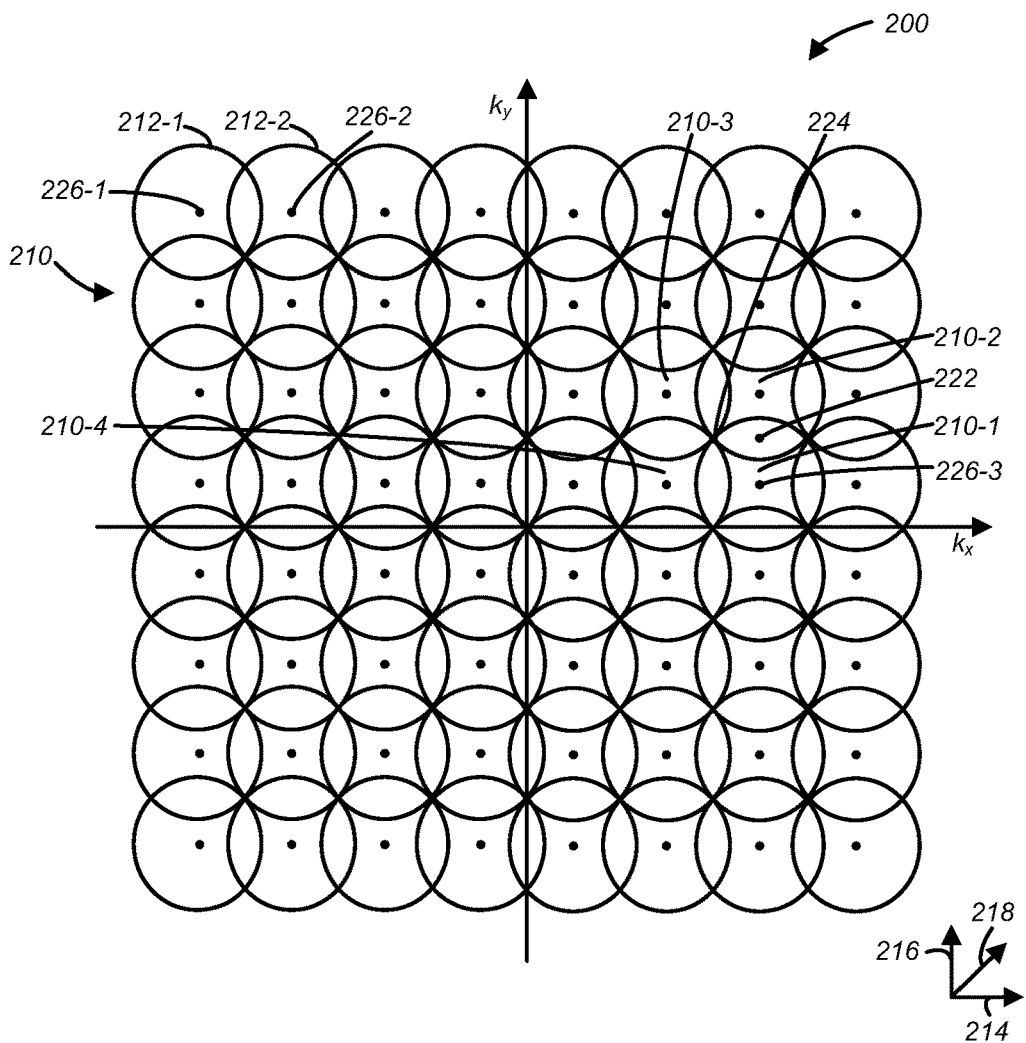
FIG. 2 illustrates a drawing of an emission pattern of a 3D electronic display in an example, according to an embodiment of the principles described herein.

The 3D views of a 3D image in the modulated light beams provided by a 3D electronic display have different principal angular directions. The 3D views in the modulated light beams can be specified by components of wavenumbers (k) or spatial frequencies of the modulated light beam in the $k_x$-$k_y$ plane. This is shown in FIG. 2, which illustrates a drawing of an emission pattern 200 of a 3D electronic display in an example, according to an embodiment of the principles described herein. In FIG. 2, the 3D electronic display is illustrated as having, but not limited to, sixty four (64) 3D views 210, with different principal angular directions 226 and associated angular ranges 212 (such as a radial distance in angular space over which the intensity of a 3D view is reduced by two thirds, which are illustrated by the large circles in FIG. 2). (Note that for clarity not all of the angular ranges 212 or the principal angular directions 226 are labeled in FIG. 2.) In general, the number of 3D views provided by the 3D electronic display represents a tradeoff between the complexity (and cost) of the 3D electronic display (such as a complexity of a backlight) and an angular resolution of the 3D electronic display.

Figure 3A:
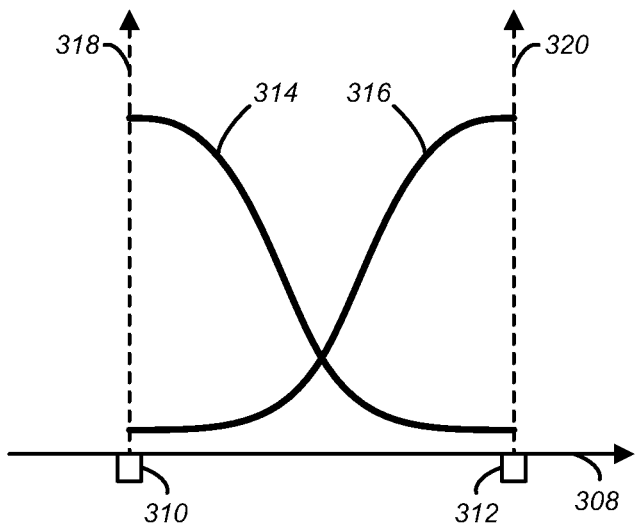
FIG. 3A illustrates a drawing of pixels in 3D views of a 3D electronic display along a direction in an example, according to an embodiment of the principles described herein.

Moreover, the 3D electronic display may control the principal angular directions 226 and the angular ranges 212 (e.g., via a multibeam diffraction grating) so that the radial distribution of light in the modulated light beams excludes angular aliasing. This is shown in FIG. 3A, which illustrates a drawing of pixels 310 and 312 contributing to 3D views 314 and 316 of a 3D electronic display (which may be instances of the 3D views described previously) along a direction 308 in an example, according to an embodiment of the principles described herein. For example, the direction 308 may be a horizontal direction 214, a vertical direction 216 or a diagonal direction 218 of the 3D electronic display that corresponds to the wavenumbers in the emission pattern 200. In FIG. 3A, the 3D views 314 and 316 have Gaussian profiles, such that an intensity of the 3D view 314 is zero at a principal angular direction 320 of the 3D view 316, and an intensity of the 3D view 316 is zero at a principal angular direction 318 of the 3D view 314. (Note that the principal angular directions 318 and 320 may be instances of the principal angular directions 226 described previously.) Nonetheless, in contrast with some existing 3D electronic displays, the 3D views 314 and 316 provided by the 3D electronic display overlap for angular directions between the principal angular directions 318 and 320. This overlap helps ensure that there is a smooth transition (without discontinuous jumps) from the 3D view 314 to the 3D view 316 as a viewing angle of a viewer moves from the principal angular direction 318 to the principal angular direction 320 (and vice versa) along the direction 308.

Referring back to FIG. 2, at an angular direction 226-3 the viewer may see or perceive a 3D view 210-1. Moreover, at an angular direction 222 the viewer may see or perceive an attenuated blend of the 3D views 210-1 and 210-2. Moreover, at an angular direction 224 the viewer may see or perceive an attenuated blend of the 3D views 210-1, 210-2, 210-3 and 210-4.

The control of the principal angular directions 226 and the angular ranges 212 provided by the 3D electronic display and the overlap of the 3D views 210 may allow the angular resolution of the 3D electronic display to be increased without increasing the complexity (and cost) of the 3D electronic display. In particular, the angular resolution may be increased by using supersampling.

Figure 3B:
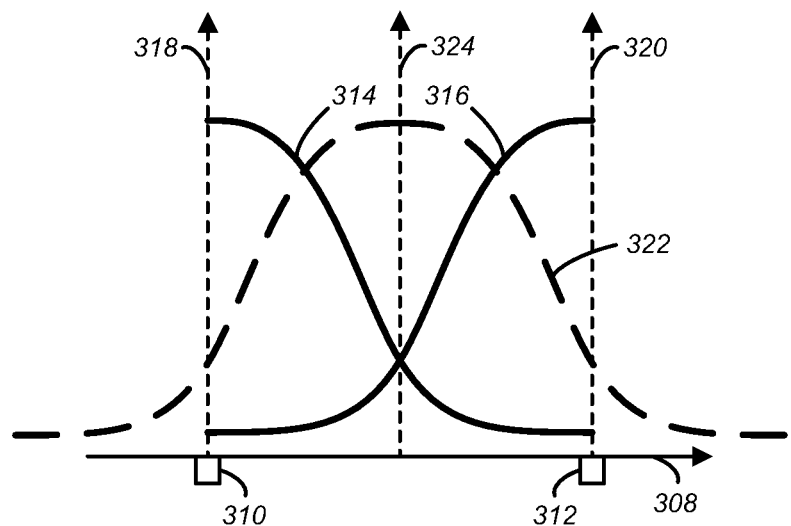
FIG. 3B illustrates a drawing of pixels in 3D views of a 3D electronic display along a direction in an example, according to an embodiment of the principles described herein.

For example, as shown in FIG. 3A, a pixel in the 3D view 314 may be applied to the pixel 310 in the 3D electronic display (i.e., the pixels in the 3D view 314 may be applied to a subset of the pixels in the 3D electronic display that includes the pixel 310) and a pixel in the 3D view 316 may be applied to the pixel 312 in the 3D electronic display (i.e., the pixels in the 3D view 316 may be applied to another subset of the pixels in the 3D electronic display that includes the pixel 312). Because of the logarithmic-scale nonlinearity of the human visual system, even at an arbitrary intermediate angular direction between the principal angular directions 318 and 320 a viewer sees or perceives either the 3D view 314 or the 3D view 316. By driving or applying angular combinations to adjacent (nearest neighbor) pairs of the pixels in the 3D electronic display (such as the pixels 310 and 312), the angular resolution of the 3D electronic display may be increased. As shown in FIG. 3B, which illustrates a drawing of the pixels 310 and 312 in the 3D electronic display along a direction 308 in an example, according to an embodiment of the principles described herein, the pixel 310 may be driven with a pixel of the 3D view 314 combined with or added to at least a product of a weight and a pixel in an intermediate 3D view 322 of the 3D image that is between the 3D view 314 and the 3D view 316 (i.e., the intermediate 3D view 322 may have an associated intermediate angular range with an intermediate principal angular direction 324 that is between the principal angular directions 318 and 320). (While the intermediate angular range of the intermediate 3D view 322 is such that there is a non-zero intensity at the principal angular directions 318 and 320, in other embodiments the intensity of the intermediate 3D view 322 at the principal angular directions 318 and 320 is zero.) Moreover, the pixel 312 may be driven with a pixel of the 3D view 316 combined with or added to at least a product of a weight and the pixel in the intermediate 3D view 322. Note that, if the direction 308 is the horizontal direction 214 or the vertical direction 216, the weight may be one half (0.5). Alternatively, if the direction 308 is the diagonal direction 218, the weight may be one quarter (0.25).

When viewing the 3D electronic display along the principal angular direction 318 or 320, the viewer sees or perceives, respectively, the 3D view 314 or the 3D view 316, and when viewing the 3D electronic display along the intermediate principal angular direction 324, the viewer sees the intermediate 3D view 322. This is because along the principal angular direction 318 or 320, the intensity of, respectively, the 3D view 314 or the 3D view 316 dominates the intermediate 3D view 322 due to the use of the weight. However, because of the overlap of Gaussian profiles of the 3D views 314 and 316 and linear superposition of the pixel in the intermediate 3D view 322, at the intermediate principal angular direction 324 the viewer sees or perceives the intermediate 3D view 322 (instead of the 3D view 314 or 316). Thus, by including the pixel in the intermediate 3D view 322 when driving the pixels 310 and 312 in the 3D electronic display, the angular sampling associated with the 3D views of the 3D image is increased (i.e., the effective number of 3D views is increased), thereby increasing the angular resolution of the 3D electronic display and further smoothing transitions between the 3D views of the 3D image that are provided by the 3D electronic display.

Figure 4:
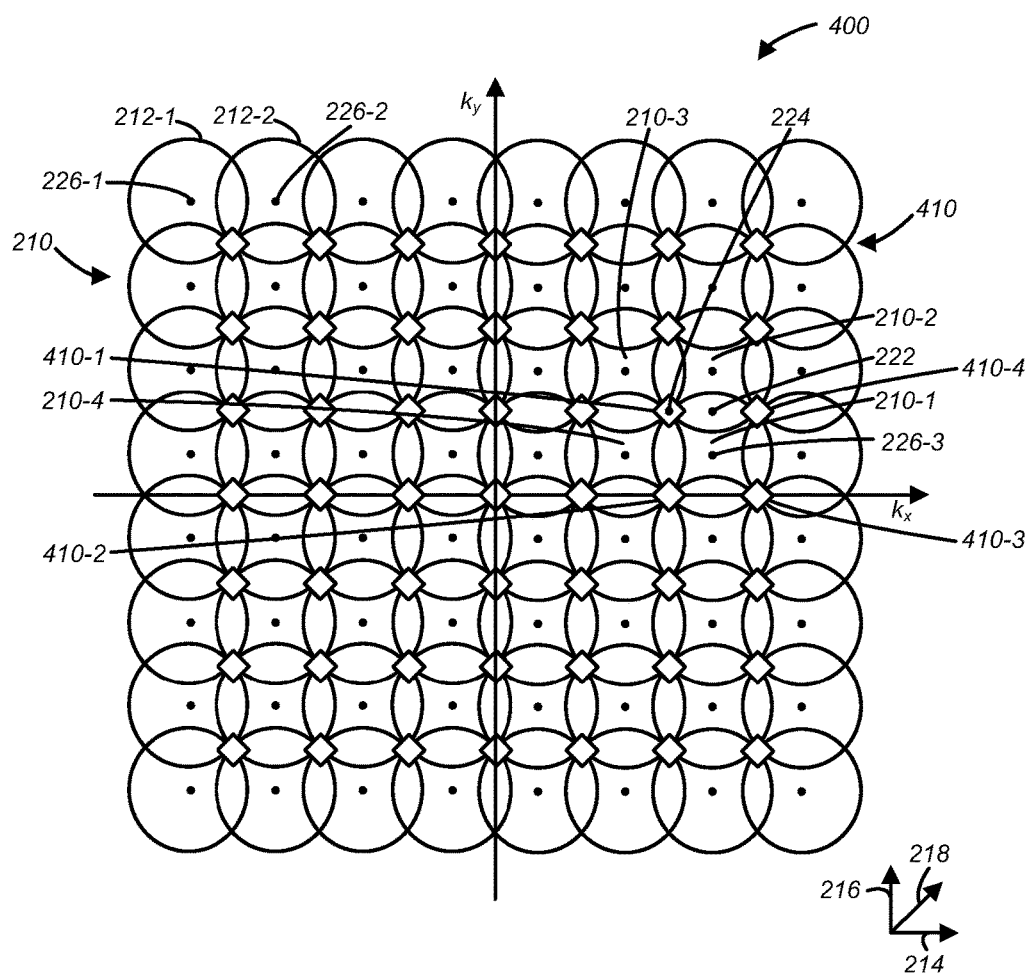
FIG. 4 illustrates a drawing of an emission pattern of a 3D electronic display with supersampling in an example, according to an embodiment of the principles described herein.

In some embodiments, by using supersampling the angular resolution of the 3D electronic display can be increased by a factor of $\sqrt{2}$, so that there are effectively one hundred and twenty eight (128) 3D views of the 3D image. This is shown in FIG. 4, which illustrates a drawing of an emission pattern 400 of the 3D electronic display with supersampling in an example, according to an embodiment of the principles described herein. In particular, there may be forty nine (49) weighted intermediate 3D views 410 (illustrated by the small diamonds in FIG. 4, however the angular range of the intermediate 3D views 410 may be the same as or different from those of the 3D views 210) that are combined with the 3D views 210 and used to drive the pixels in a 3D electronic display.

As shown in FIG. 4, an intermediate 3D view 410-1 may be along the diagonal direction 218 of the 3D electronic display, and a weighted intermediate 3D view 410-1 may be included in the angular combinations with the 3D views 210-1, 210-2, 210-3 and 210-4 that are driven on a group of four adjacent pairs of pixels in the 3D electronic display. Alternatively, a pixel in the 3D electronic display corresponding to the angular direction 226-3 may be driven with a pixel in the 3D view 210-1 and weighted pixels in the intermediate views 410-1, 410-2, 410-3 and 410-4. In particular, the pixel in the 3D electronic display corresponding to the angular direction 226-3 may be driven with $$P + \sum_{i=1}^{8} \alpha_i \cdot Q_i,$$

where P is a pixel in the 3D view 210-1, αi is a weight and Qi are corresponding pixels in the intermediate 3D views 410. (More generally, there may be four (4) pixels in the groups of adjacent pixels in the 3D electronic display, except at edges of the 3D electronic display, where there are one (1) or two (2) pixels from the intermediate 3D views in the groups of adjacent pixels.) In these embodiments, the weights of the intermediate 3D views used in the angular combinations are each one quarter (0.25).

When viewed along the principal angular direction 226-3, the viewer sees or perceives the 3D view 210-1 (plus a small portion of the intermediate views 410-1, 410-2, 410-3 and 410-4). Moreover, at the angular direction 222 the viewer may see or perceive an attenuated blend of the 3D views 210-1 and 210-2, and the intermediate 3D views 410-1 and 410-4. Furthermore, at the angular direction 224 a viewer may see or perceive the intermediate 3D view 410-1 (plus a small portion of the 3D views 210-1, 210-2, 210-3 and 210-4).

Figure 5:
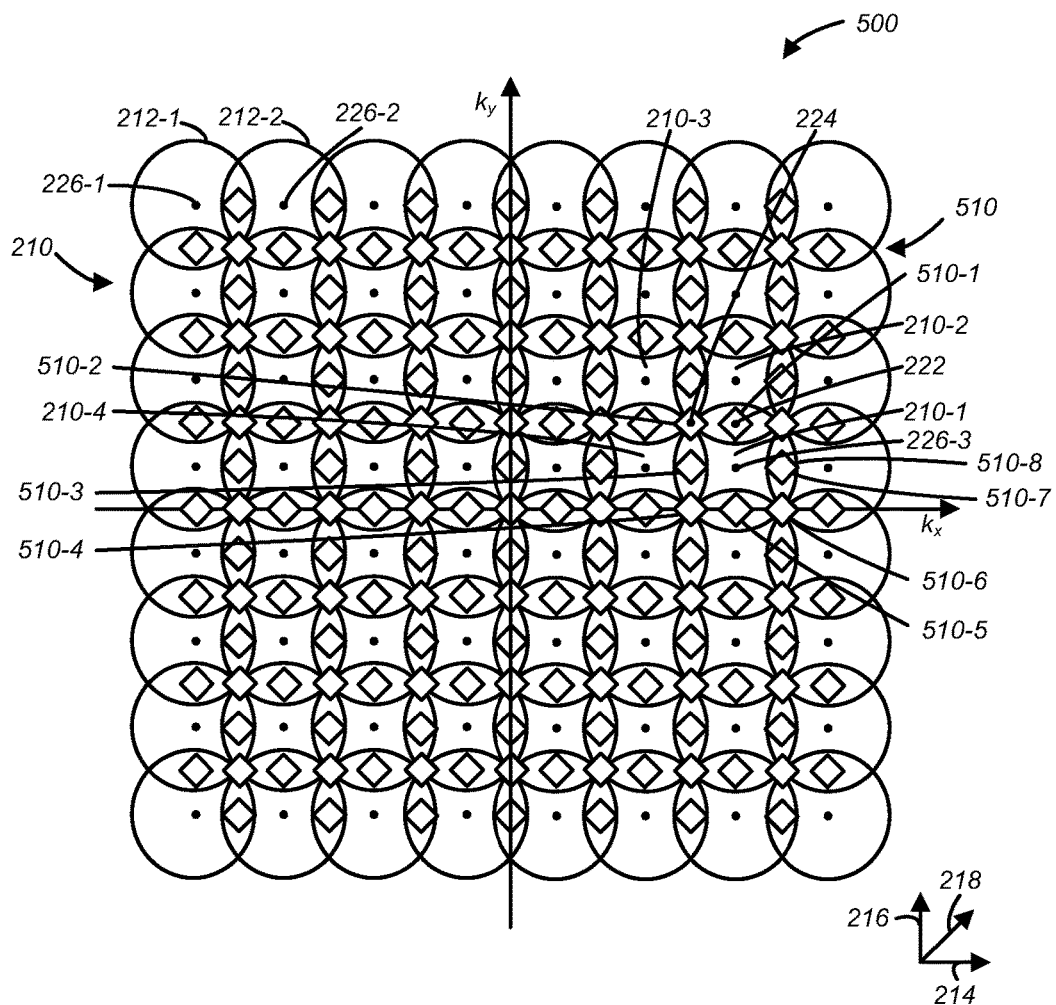
FIG. 5 illustrates a drawing of an emission pattern of a 3D electronic display with supersampling in an example, according to an embodiment of the principles described herein.

In some embodiments, by using supersampling the angular resolution of the 3D electronic display can be increased by a factor of two (2) so that there are effectively two hundred fifty six (256) 3D views of the 3D image. This is shown in FIG. 5, which illustrates a drawing of an emission pattern 500 of the 3D electronic display with supersampling in an example, according to an embodiment of the principles described herein. In particular, there may be one hundred sixty one (161) weighted intermediate 3D views 510 that are combined with the 3D views 210 and used to drive the pixels in a 3D electronic display.

As shown in FIG. 5, an intermediate 3D view 510-1 may be along the horizontal direction 214 of the 3D electronic display, and a weighted intermediate 3D view 510-1 may be included in the angular combinations with the 3D views 210-1 and 210-2 that are driven on an adjacent pair of pixels in the 3D electronic display. Similarly, an intermediate 3D view 510-3 may be along the vertical direction 216 of the 3D electronic display, and a weighted intermediate 3D view 510-3 may be included in the angular combinations with the 3D views 210-1 and 210-4 that are driven on an adjacent pair of pixels in the 3D electronic display. Furthermore, an intermediate 3D view 510-2 may be along the diagonal direction of the 3D electronic display, and a weighted intermediate 3D view 510-2 may be included in the angular combinations with the 3D views 210-1, 210-2, 210-3 and 210-4 that are driven on a group of four adjacent pairs of pixels in the 3D electronic display. Stated differently, a pixel in the 3D electronic display corresponding to the angular direction 226-3 may be driven with a pixel in the 3D view 210-1 and weighted pixels in the intermediate views 510-1,

510-2, 510-3, 510-4, 510-5, 510-6, 510-7 and 510-8. In particular, the pixel in the 3D electronic display corresponding to the angular direction 226-3 may be driven with $$P + \sum_{i=1}^{8} \alpha_i \cdot Q_i,$$

where P is a pixel in the 3D view 210-1, αi is a weight and Qi are corresponding pixels in the intermediate 3D views 510. (More generally, there may be eight (8) pixels in the groups of adjacent pixels in the 3D electronic display, except at edges of the 3D electronic display, where there are three (3) or five (5) pixels from the intermediate 3D views 510 in the groups of adjacent pixels.) In these embodiments, the weights of the intermediate 3D views 510 used in the angular combinations are one half (0.5) for the intermediate 3D views 510 along the horizontal direction 214 or the vertical direction 216, and one quarter (0.25) for the intermediate 3D views 510 along the vertical direction 216.

While the supersampling technique may be used with different embodiments of a 3D electronic device, in the discussion that follows a 3D electronic device that includes multibeam diffraction gratings is used as an illustrative example.

Figure 6:
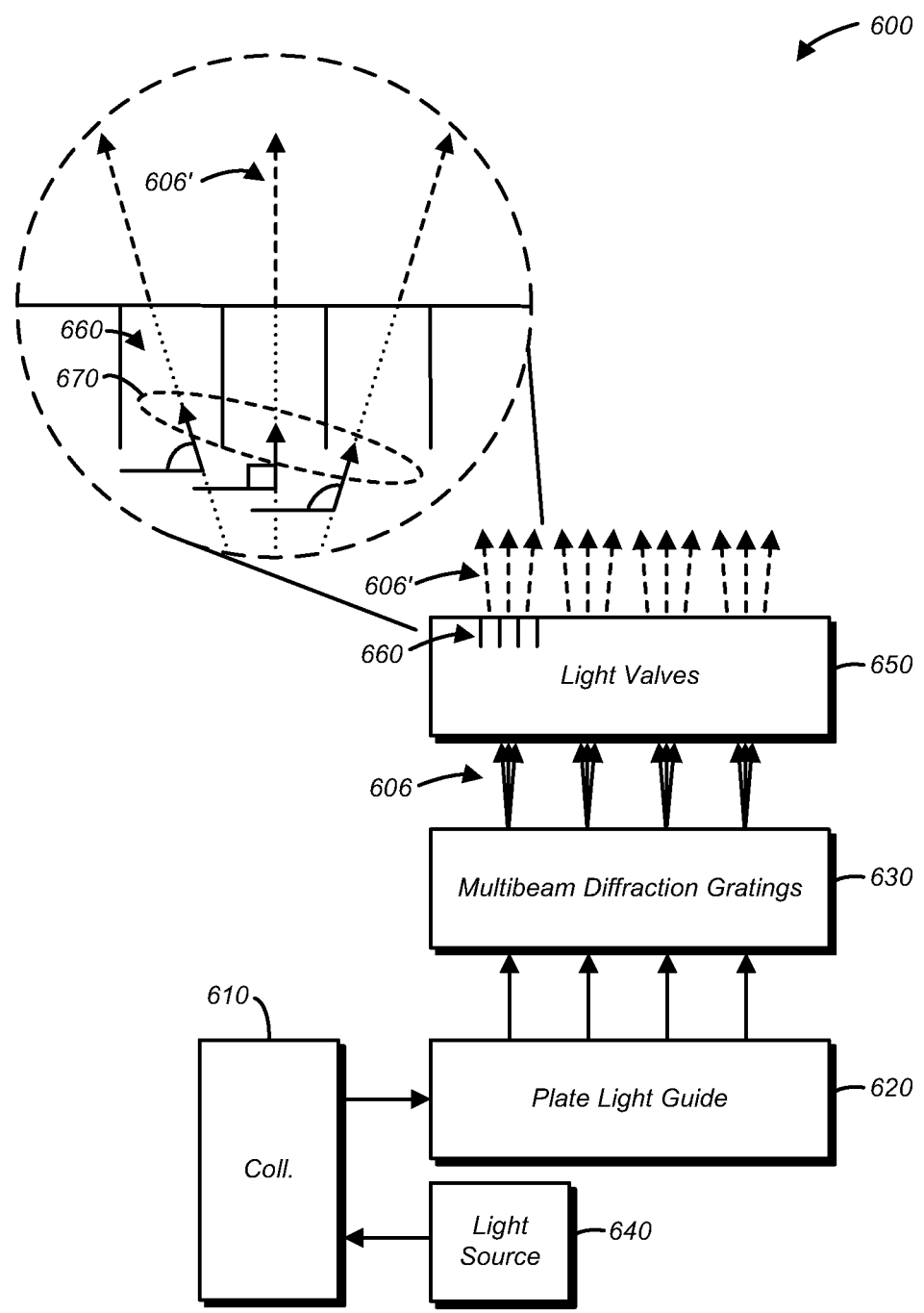
FIG. 6 illustrates a block diagram of a three-dimensional (3D) electronic display in an example, according to an embodiment of the principles described herein.

In accordance with some embodiments of the principles described herein, a 3D electronic display is provided. FIG. 6 illustrates a block diagram of a 3D electronic display 600 in an example, according to an embodiment of the principles described herein. The 3D electronic display 600 is configured to produce directional light comprising light beams having different principal angular directions and, in some embodiments, also having a plurality of different colors. For example, the 3D electronic display 600 may provide or generate a plurality of different light beams 606 directed out and away from the 3D electronic display 600 in different predetermined principal angular directions (e.g., as a light field). Further, the different light beams 606 may include light beams 606 of or having different colors of light. In turn, the light beams 606 of the plurality may be modulated as modulated light beams 606' to facilitate the display of information including color information (e.g., when the light beams 606 are color light beams), according to some embodiments.

In particular, the modulated light beams 606' having different predetermined principal angular directions may form a plurality of pixels 660 of the 3D electronic display 600. In some embodiments, the 3D electronic display 600 may be a so-called 'glasses free' 3D color electronic display (e.g., a multiview, 'holographic' or autostereoscopic display) in which the light beams 606' correspond to the pixels 660 associated with different 'views' of the 3D electronic display 600. The modulated light beams 606' are illustrated using dashed line arrows in FIG. 6, while the different light beams 606 prior to modulation are illustrated as solid line arrows, by way of example.

As illustrated in FIG. 6, the 3D electronic display 600 further comprises a plate light guide 620. The plate light guide 620 is configured to guide collimated light as a guided light beam at a non-zero propagation angle. In particular, the guided light beam may be guided at the non-zero propagation angle relative to a surface (e.g., one or both of a top surface and a bottom surface) of the plate light guide 620. The surface may be parallel to the horizontal plane in some embodiments.

According to various embodiments and as illustrated in FIG. 6, the 3D electronic display 600 further comprises an array of multibeam diffraction gratings 630 located at a surface of the plate light guide 620. In particular, a multibeam diffraction grating of the array is configured to diffractively couple out a portion of the guided light beam as plurality of coupled-out light beams having different principal angular directions and representing the light beams 606 in FIG. 6. Moreover, the different principal angular directions of the light beams 606 coupled out by the multibeam diffraction gratings 630 correspond to different 3D views of the 3D electronic display 600, according to various embodiments. In some embodiments, the multibeam diffraction grating of the array comprises a chirped diffraction grating having curved diffractive features. In some embodiments, a chirp of the chirped diffraction grating is a linear chirp.

In some embodiments, the 3D electronic display 600 (e.g., as illustrated in FIG. 6) further comprises a light source 640 configured to provide light to an input of the plate light guide 620. In particular, the light source 640 may comprise a plurality of different light emitting diodes (LEDs) configured to provide different colors of light (referred to as 'different colored LEDs' for simplicity of discussion). In some embodiments, the different colored LEDs may be offset (e.g., laterally offset) from one another. The offset of the different colored LEDs is configured to provide different, color-specific, non-zero propagation angles of the collimated light from a collimator (Coll.) 610. Further, a different, color-specific, non-zero propagation angle may correspond to each of the different colors of light provided by the light source 640.

In some embodiments (not illustrated), the different colors of light may comprise the colors red, green and blue of a red-green-blue (RGB) color model. Further, the plate light guide 620 may be configured to guide the different colors as light beams at different color-dependent non-zero propagation angles within the plate light guide 620. For example, a first guided color light beam (e.g., a red light beam) may be guided at a first color-dependent, non-zero propagation angle, a second guided color light beam (e.g., a green light beam) may be guided at a second color-dependent non-zero propagation angle, and a third guided color light beam (e.g., a blue light beam) may be guided at a third color-dependent non-zero propagation angle, according to some embodiments. Note that a 'color light beam' may include a wavelength of light corresponding to a particular color (such as red, blue or green).

As illustrated in FIG. 6, the 3D electronic display 600 may further comprise a light valve array 650. According to various embodiments, the light valve array 650 is configured to modulate the coupled-out light beams 606 of the light beam plurality as the modulated light beams 606' to form or serve as the 3D pixels corresponding to the different 3D views of the 3D electronic display 600. In some embodiments, the light valve array 650 comprises a plurality of liquid crystal light valves. In other embodiments, the light valve array 650 may comprise another light valve including, but not limited to, an electrowetting light valve, an electrophoretic light valve, a combination thereof, or a combination of liquid crystal light valves and another light valve type, for example. Note that these light valves are sometimes referred to as 'cells' or 'pixels' (such as pixels 660) in the 3D electronic display 600.

In FIG. 6, light beams 606 diffractively coupled out of a multibeam diffraction grating of the array have different principal angular directions 670. These light beams 606 are modulated by the pixels 660 in the light valves 650 to produce the modulated light beams 606'. Using the 3D electronic display 600 with a twisted nematic liquid crystal as an example, the modulated light beams 606' may be produced by applying pixel drive signals to the light valves 650. These pixel drive signals may be six (6) or eight (8) bit digital values that result in discrete or stepwise analog signals (e.g., from a driver circuit, which may be included in a 'driver' or a 'display driver') applied to the cells or the pixels 660 in the light values 650, for example. It should be understood however, more generally, the pixel drive signals may be an analog signal or a digital signal. The discrete analog signals may include voltages that oriented the molecules in the twisted nematic liquid crystal so that the birefringence of the twisted nematic liquid crystal produces a desired rotation or phase change of the light beams 606 as they the transit the pixels 660. The varying phase change may result in different intensities of light being passed by crossed polarizers in the pixels 660 (and, thus, different intensities of the modulated light beams 606'). In this way, a desired brightness and contrast can be produced across the 3D electronic display 600. Moreover, a location in color space can be obtained by applying different voltages to subsets of the pixels 660 associated with different colors (in embodiments where color filters are used) or by applying different voltages to the pixels 660 at different times (in embodiments where the color of the light beams 606 varies sequentially as a function of time between different colors, i.e., the light beams are color light beams in a field-sequential-color system). In particular, the human visual system may integrate the different intensities of different colors for the different pixels 660 to perceive a location in color space.

Furthermore, the pixels 660 may be driven using pixel drive signals that include the angular combinations. For example, a pixel in an adjacent pair of pixels may be driven by an angular combination of a pixel in a 3D view of a 3D image and at least one product of a pixel in an intermediate 3D view and an associated weight, and the 3D views applied to the pair of pixels may have different associated angular ranges with the different principal angular directions 670. Additionally, the intermediate 3D view may have an associated intermediate angular range with an intermediate principal angular direction that is between the principal angular directions 670. When viewing the 3D electronic display 600 along a principal angular direction in the principal angular directions 670 of the 3D view, a viewer sees the 3D view, and when viewing the 3D electronic display along the intermediate principal angular direction, the viewer sees the intermediate 3D view. In this way, the spatial resolution of the 3D electronic display 600 may be increased electronically.

Figure 7A:
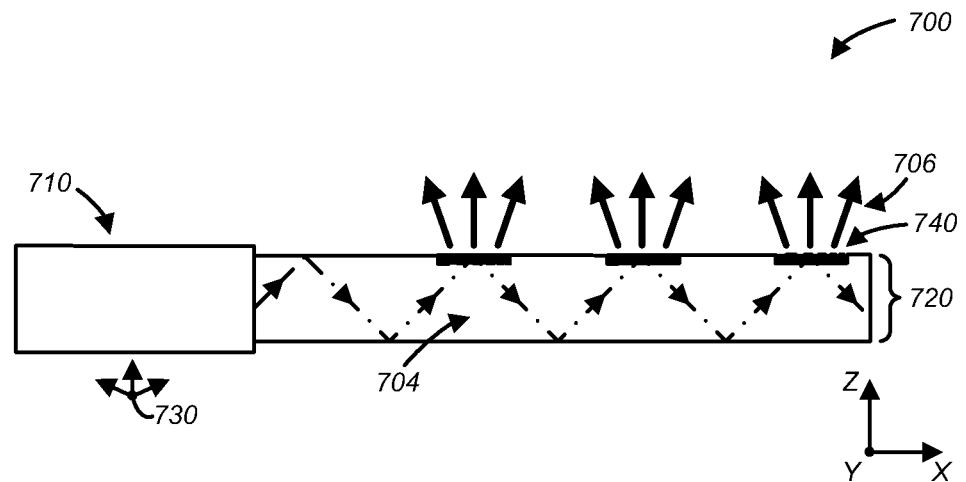
FIG. 7A illustrates a cross sectional view of a backlight in an example, according to an embodiment consistent with the principles described herein.
Figure 7B:
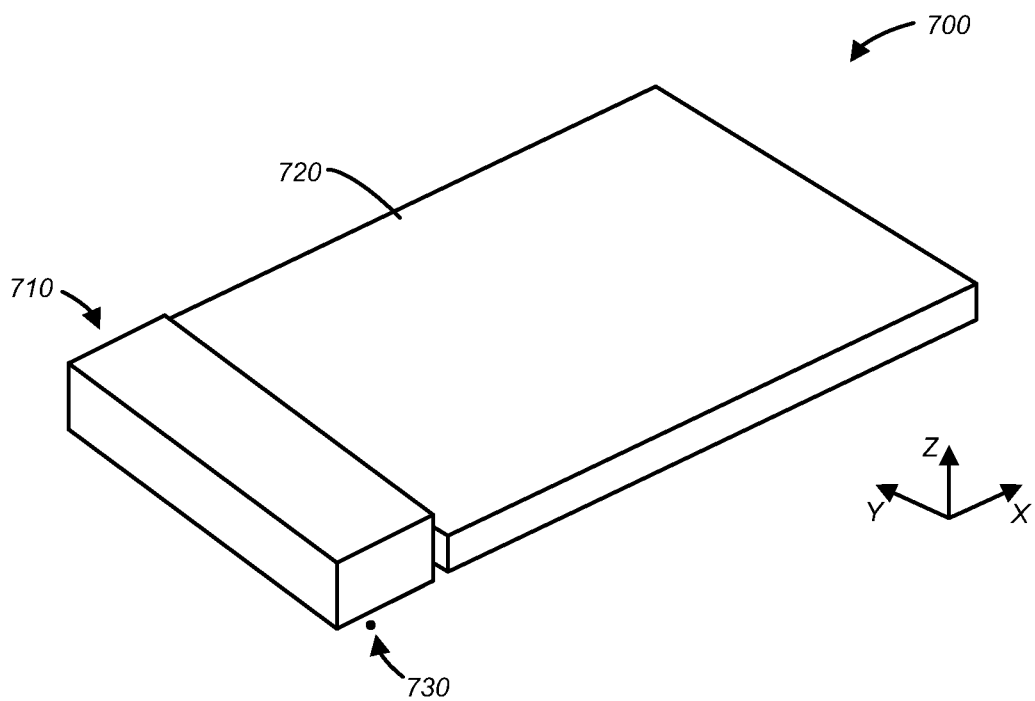
FIG. 7B illustrates a cross sectional view of an alignment between an output aperture of a collimator and an input aperture of a plate light guide in an example, according to an embodiment consistent with the principles described herein.

FIG. 7A illustrates a cross sectional view of a multibeam diffraction grating-based display 700 in an example, according to an embodiment consistent with the principles of the principles described herein. FIG. 7B illustrates a perspective view of the multibeam diffraction grating-based display 700 in an example, according to an embodiment consistent with the principles described herein. As illustrated in FIG. 7A, a plate light guide 720 is configured to receive and to guide the collimated light 704 at a non-zero propagation angle. In particular, the plate light guide 720 may receive the collimated light 704 at an input end or equivalently an input aperture of the plate light guide 720. According to various embodiments, the plate light guide 720 is further configured to emit a portion of the guided, collimated light 704 from a surface of the plate light guide 720. In FIG. 7A, emitted light 706 is illustrated as a plurality of rays (arrows) extending away from the plate light guide surface.

In some embodiment, the plate light guide 720 may be a slab or plate optical waveguide comprising an extended, planar sheet of substantially optically transparent, dielectric material. The planar sheet of dielectric material is configured to guide the collimated light 704 from the collimator 710 as a guided light beam 704 using total internal reflection. The dielectric material may have a first refractive index that is greater than a second refractive index of a medium surrounding the dielectric optical waveguide. The difference in refractive indices is configured to facilitate total internal reflection of the guided light beam 704 according to one or more guided modes of the plate light guide 720.

According to various examples, the substantially optically transparent material of the plate light guide 720 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 720 may further include a cladding layer (not illustrated) on at least a portion of a surface (e.g., one or both of the top surface and the bottom surface) of the plate light guide 720. The cladding layer may be used to further facilitate total internal reflection, according to some examples.

According to some embodiments, the multibeam diffraction grating-based display 700 may further comprise the light source 730. The light source 730 is configured to provide light 702 to the collimator 710. In particular, the light source 730 is configured to provide the light 702 as collimated light 704 (or a collimated light beam). In various embodiments, the light source 730 may comprise substantially any source of light including, but not limited to, one or more light emitting diodes (LEDs). In some embodiments, the light source 730 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In some embodiments, the light source 730 may comprise a plurality of different optical sources configured to provide different colors of light. The different optical sources may be offset from one another, for example. The offset of the different optical sources may be configured to provide different, color-specific, non-zero propagation angles of the collimated light 704 corresponding to each of the different colors of light, according to some embodiments. In particular, the offset may add an additional non-zero propagation angle component to the non-zero propagation angle provided by the collimator 710, for example.

According to some embodiments (e.g., as illustrated in FIG. 7A), the multibeam diffraction grating-based display 700 may further comprise a multibeam diffraction grating 740 at a surface of the plate light guide 720. The multibeam diffraction grating 740 is configured to diffractively couple out a portion of the guided, collimated light 704 from the plate light guide 720 as a plurality of light beams 706. The plurality of light beams 706 (i.e., the plurality of rays (arrows) illustrated in FIG. 7A) represents the emitted light 706. In various embodiments, a light beam 706 of the light beam plurality has a principal angular direction that is different from principal angular directions of other light beams 706 of the light beam plurality.

In some embodiments, the multibeam diffraction grating 740 is a member of or is arranged in an array of multibeam diffraction gratings 740. In some embodiments, the multibeam diffraction grating-based display 700 is a 3D electronic display and the principal angular direction of the light beam 706 corresponds to a view direction of the 3D electronic display.

Figure 8A:
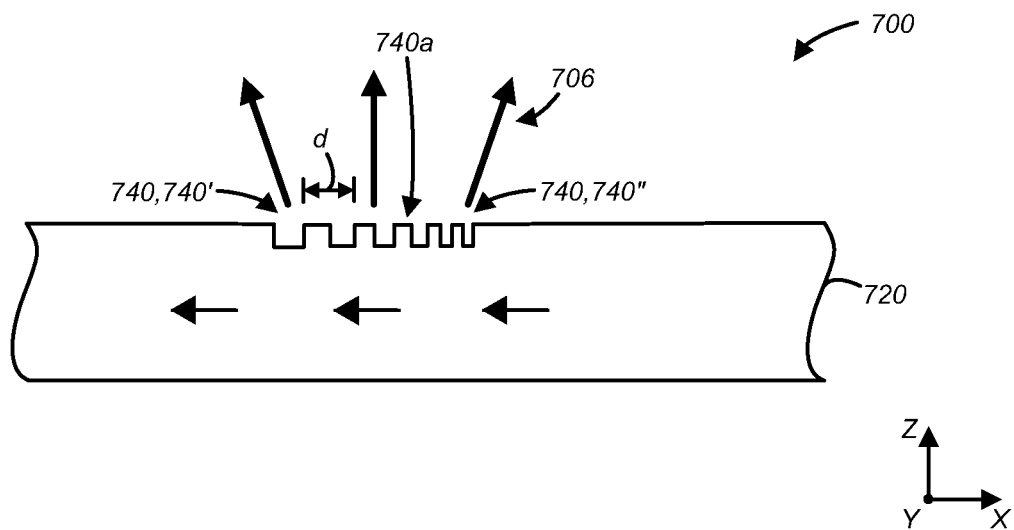
FIG. 8A illustrates a cross sectional view of a portion of a backlight with a multibeam diffraction grating in an example, according to an embodiment consistent with the principles described herein.
Figure 8B:
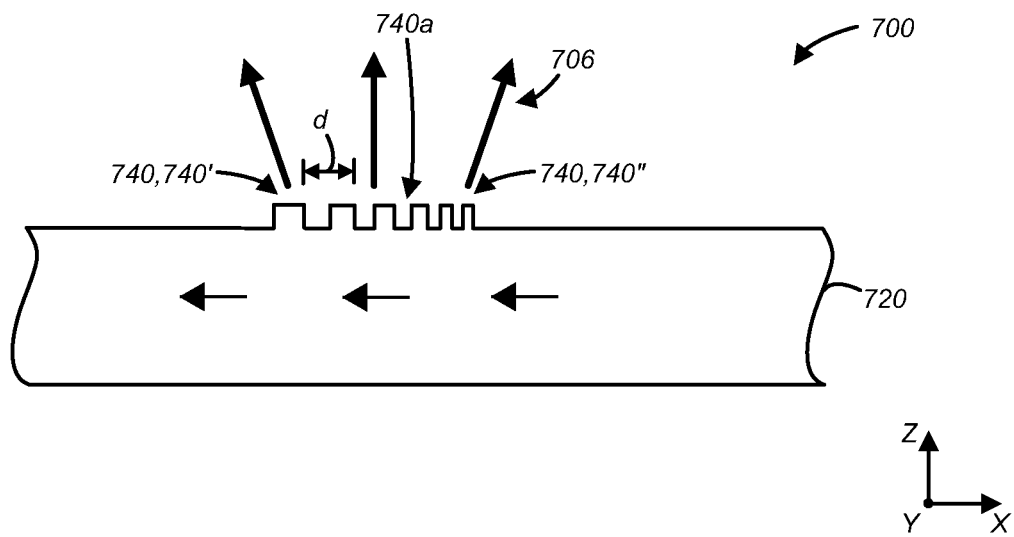
FIG. 8B illustrates a cross sectional view of a portion of a backlight with a multibeam diffraction grating in an example, according to another embodiment consistent with the principles described herein.
Figure 8C:
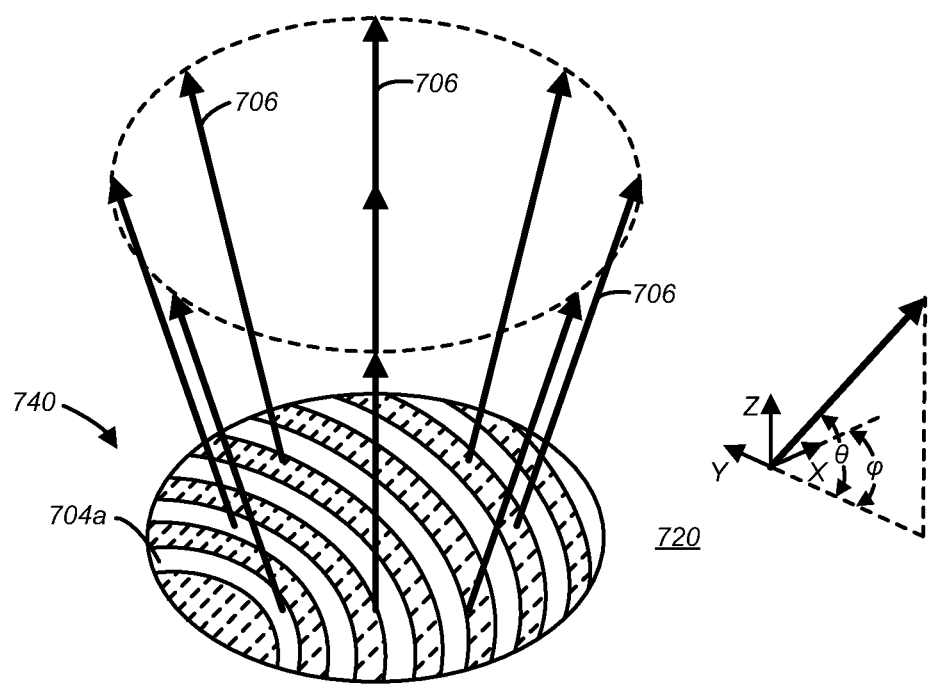
FIG. 8C illustrates a perspective view of the backlight portion of either FIG. 8A or FIG. 8B including the multibeam diffraction grating in an example, according to an embodiment consistent with the principles described herein.

FIG. 8A illustrates a cross sectional view of a portion of a multibeam diffraction grating-based display 700 with a multibeam diffraction grating 740 in an example, according to an embodiment consistent with the principles described herein. FIG. 8B illustrates a cross sectional view of a portion of a multibeam diffraction grating-based display 700 with a multibeam diffraction grating 740 in an example, according to another embodiment consistent with the principles described herein. FIG. 8C illustrates a perspective view of a portion of either FIG. 8A or FIG. 8B including the multibeam diffraction grating 740 in an example, according to an embodiment consistent with the principles described herein. The multibeam diffraction grating 740 illustrated in FIG. 8A comprises grooves in a surface of the plate light guide 720, by way of example and not limitation. FIG. 8B illustrates the multibeam diffraction grating 740 comprising ridges protruding from the plate light guide surface.

As illustrated in FIGS. 8A and 8B, the multibeam diffraction grating 740 is a chirped diffraction grating. In particular, the diffractive features 740a are closer together at a second end 740" of the multibeam diffraction grating 740 than at a first end 740'. Further, the diffractive spacing d of the illustrated diffractive features 740a varies from the first end 740' to the second end 740". In some embodiments, the chirped diffraction grating of the multibeam diffraction grating 740 may have or exhibit a chirp of the diffractive spacing d that varies linearly with distance. As such, the chirped diffraction grating of the multibeam diffraction grating 740 may be referred to as a 'linearly chirped' diffraction grating.

In another embodiment, the chirped diffraction grating of the multibeam diffraction grating 740 may exhibit a non-linear chirp of the diffractive spacing d. Various non-linear chirps that may be used to realize the chirped diffraction grating include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used in the multibeam diffraction grating 740.

As illustrated in FIG. 8C, the multibeam diffraction grating 740 includes diffractive features 740a (e.g., grooves or ridges) in, at or on a surface of the plate light guide 720 that are both chirped and curved (i.e., the multibeam diffraction grating 740 is a curved, chirped diffraction grating, as illustrated). The guided light beam 704 guided in the plate light guide 720 has an incident direction relative to the multibeam diffraction grating 740 and the plate light guide 720, as illustrated by a bold arrow in FIGS. 8A-8C. Also illustrated is the plurality of coupled-out or emitted light beams 706 pointing away from the multibeam diffraction grating 740 at the surface of the plate light guide 720. The illustrated light beams 706 are emitted in a plurality of different predetermined principal angular directions. In particular, the different predetermined principal angular directions of the emitted light beams 706 are different in both azimuth and elevation (e.g., to form a light field).

According to various examples, both the predefined chirp of the diffractive features 740a and the curve of the diffractive features 740a may be responsible for a respective plurality of different predetermined principal angular directions of the emitted light beams 706. For example, due to the diffractive feature curve, the diffractive features 740a within the multibeam diffraction grating 740 may have varying orientations relative to an incident direction of the guided light beam 704 within the plate light guide 720. In particular, an orientation of the diffractive features 740a at a first point or location within the multibeam diffraction grating 740 may differ from an orientation of the diffractive features 740a at another point or location relative to the guided light beam incident direction. With respect to the coupled-out or emitted light beam 706, an azimuthal component φ of the principal angular direction {θ, φ} of the light beam 706 may be determined by or correspond to the azimuthal orientation angle $\phi_f$ of the diffractive features 740a at a point of origin of the light beam 706 (i.e., at a point where the incident guided light beam 704 is coupled out). As such, the varying orientations of the diffractive features 740a within the multibeam diffraction grating 740 produce the different light beams 706 having different principal angular directions {θ, φ}, at least in terms of their respective azimuthal components φ.

In particular, at different points along the curve of the diffractive features 740a, an 'underlying diffraction grating' of the multibeam diffraction grating 740 associated with the curved diffractive features 740a has different azimuthal orientation angles $\phi_f$. By 'underlying diffraction grating', it is meant that diffraction gratings of a plurality of non-curved diffraction gratings in superposition yield the curved diffractive features 740a of the multibeam diffraction grating 740. Thus, at a given point along the curved diffractive features 740a, the curve has a particular azimuthal orientation angle $\phi_f$ that generally differs from the azimuthal orientation angle $\phi_f$ another point along the curved diffractive features 740a. Further, the particular azimuthal orientation angle $\phi_f$ results in a corresponding azimuthal component φ of a principal angular direction {θ, φ} of a light beam 706 emitted from the given point. In some examples, the curve of the diffractive features 740a (e.g., grooves, ridges, etc.) may represent a section of a circle. The circle may be coplanar with the light guide surface. In other examples, the curve may represent a section of an ellipse or another curved shape, e.g., that is coplanar with the plate light guide surface.

In other embodiments, the multibeam diffraction grating 740 may include diffractive features 740a that are 'piecewise' curved. In particular, while the diffractive feature 740a may not describe a substantially smooth or continuous curve per se, at different points along the diffractive feature 740a within the multibeam diffraction grating 740, the diffractive feature 740a still may be oriented at different angles with respect to the incident direction of the guided light beam 704. For example, the diffractive feature 740a may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 740a may merely have different orientations relative to the incident direction of the guided light at different locations within the multibeam diffraction grating 740 without approximating a particular curve (e.g., a circle or an ellipse).

In some embodiments, the grooves or ridges that form the diffractive features 740a may be etched, milled or molded into the plate light guide surface. As such, a material of the multibeam diffraction gratings 740 may include the material of the plate light guide 720. As illustrated in FIG. 8B, for example, the multibeam diffraction grating 740 includes ridges that protrude from the surface of the plate light guide 720, wherein the ridges may be substantially parallel to one another. In FIG. 8A (and FIG. 7A), the multibeam diffraction grating 740 includes grooves that penetrate the surface of the plate light guide 720, wherein the grooves may be substantially parallel to one another. In other examples (not illustrated), the multibeam diffraction grating 740 may comprise a film or layer applied or affixed to the light guide surface. The plurality of light beams 706 in different principal angular directions provided by the multibeam diffraction gratings 740 are configured to form a light field in a viewing direction of an electronic display. In particular, the multibeam diffraction grating-based display 700 employing collimation is configured to provide information, e.g., 3D information, corresponding to pixels of an electronic display.

Figure 9A:
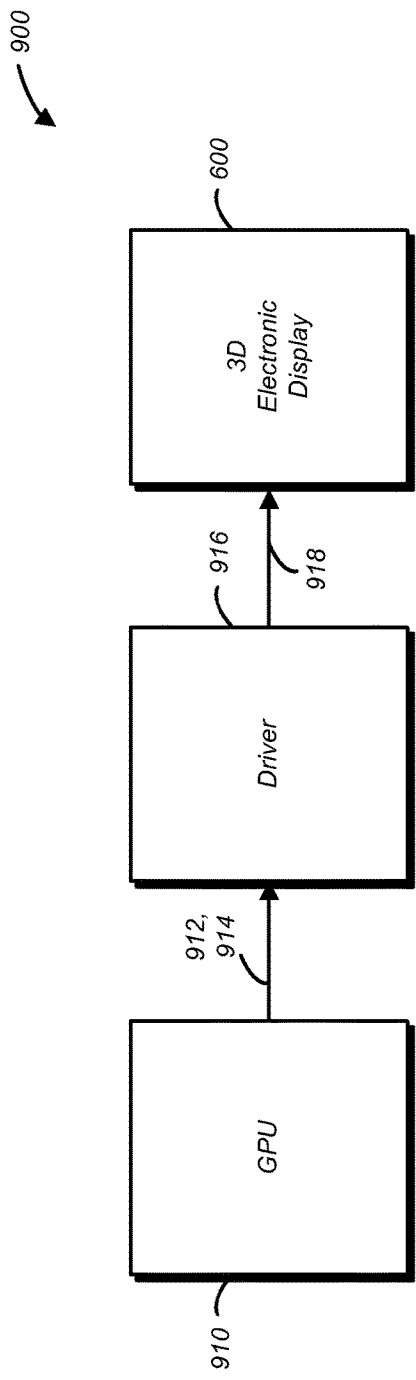
FIG. 9A illustrates a block diagram of an electronic device that includes a 3D electronic display in an example, according to an embodiment of the principles described herein.

According to some embodiments, the supersampling technique may be implemented using an electronic device. FIG. 9A illustrates a block diagram of an electronic device 900 that includes the 3D electronic display 600 in an example, according to an embodiment of the principles described herein. As illustrated in FIG. 9A, the electronic device 900 comprises a graphics processing unit (GPU) 910. The graphics processing unit 910 is configured to generate 3D views 912 (such as the 3D views 210 described previously) based on a 3D image. Moreover, the graphics processing unit 910 may determine or calculate the intermediate 3D views 914 (such as the intermediate 3D views 410 or 510 described previously) based on the 3D image, the 3D views 912 or both. For example, the 3D views 912 may be generated by projecting the 3D image along the principal angular directions 226. Furthermore, the intermediate 3D views 914 may be generated by at least one of: projecting the 3D image along the intermediate principal angular directions, interpolating between the 3D views 912 or applying a rotation operator to the 3D views 912. Then, a driver 916 (e.g., a driver circuit, which is sometimes referred to as a 'display driver') may apply pixel drive signals 918 to the pixels 660 in the 3D electronic display 600 based on the 3D views 912, the intermediate 3D views 914 and associated weights. These pixel drive signals may include the angular combinations of the 3D views 912 and the products of the intermediate 3D views 914 and the associated weights.

Note that the pixel drive signals 918 may be six (6) or eight (8) bit digital values that result in discrete or stepwise analog signals applied to cells or the pixels 660 in the 3D electronic display 600. (However, more generally, the pixel drive signals 918 may be analog signals or digital values.) The discrete analog signals may include voltages that oriented the molecules in a twisted nematic liquid crystal (which is used as a non-limiting example of the light values 650) so that the birefringence of the twisted nematic liquid crystal produces a desired rotation or phase change of the light beams 606 as they transit the pixels 660. The varying phase change may result in different intensities of light being passed by crossed polarizers in the pixels 660 (and, thus, different intensities of the modulated light beams 606'). In this way, a desired brightness and contrast can be produced across the 3D electronic display 600. In addition, a location in color space can be obtained by applying different voltages to subsets of the pixels 660 associated with different colors (in embodiments where color filters are used) or by applying different voltages to the pixels 660 at different times (in embodiments where the color of the light beams 606 varies sequentially as a function of time between different colors, i.e., light beams are color light beams in a field-sequential-color system). In particular, the human visual system may integrate the different intensities of different colors for different the pixels 660 to perceive a location in color space.

Figure 9B:
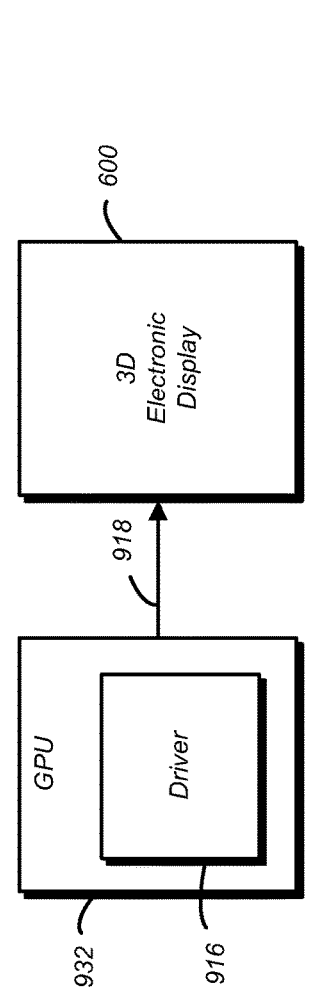
FIG. 9B illustrates a block diagram of an electronic device that includes a 3D electronic display in an example, according to an embodiment of the principles described herein.

Instead of a separate driver 916, in some embodiments the driver 916 or at least some of the functions of driver 916 is included in the graphics processing unit. This is shown in FIG. 9B, which illustrates a block diagram of an electronic device 930 that includes the 3D electronic display 600 in an example, according to another embodiment of the principles described herein. In particular, in FIG. 9B, a graphics processing unit 932 includes the driver 916.

In the preceding discussion, note that the driver 916, the graphics processing unit 910, or the graphics processing unit 932 is sometimes referred to as a 'display-driver apparatus.'

While FIGS. 9A and 9B illustrate the supersampling technique in electronic devices that include the 3D electronic display 600, in some embodiments the supersampling technique is implemented in one or more components in one of electronic devices 900 and 930, such as one or more components in the 3D electronic display 600, which may be provide separately from or in conjunction with a remainder of the 3D electronic display 600 or one of the electronic devices 900 and 930.

Embodiments consistent with the principles described herein may be implemented using a variety of devices and circuits including, but not limited to, one of integrated circuits (ICs), very large scale integrated (VLSI) circuits, application specific integrated circuits (ASIC), field programmable gate arrays (FPGAs), digital signal processors (DSPs), and the like, firmware, software (such as a program module or a set of instructions), and a combination of two or more of the above. For example, elements or 'blocks' of an embodiment consistent with the principles described herein may all be implemented as circuit elements within an ASIC or a VLSI circuit. Implementations that employ an ASIC or a VLSI circuit are examples of hardware-based circuit implementation, for example. In another example, an embodiment may be implemented as software using a computer programming language (e.g., C/C++) that is executed in an operating environment or software-based modeling environment (e.g., Matlab®, MathWorks, Inc., Natick, Mass.) that is executed by a computer (e.g., stored in memory and executed by a processor or a graphics processor of a computer). Note that the one or more computer programs or software may constitute a computer-program mechanism, and the programming language may be compiled or interpreted, e.g., configurable or configured (which may be used interchangeably in this discussion), to be executed by a processor or a graphics processor of a computer. In yet another example, some of the blocks, modules or elements may be implemented using actual or physical circuitry (e.g., as an IC or an ASIC), while other blocks may be implemented in software or firmware. In particular, according to the definitions above, some embodiments described herein may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

The electronic device can be (or can be included in): a desktop computer, a laptop computer, a subnotebook/netbook, a server, a tablet computer, a smartphone, a cellular telephone, a smartwatch, a consumer-electronic device, a portable computing device, an integrated circuit, a portion of a 3D electronic display (such as a portion of the 3D electronic display 600) or another electronic device. This electronic device may include some or all of the functionality of the electronic device 900 or 930.

An integrated circuit may implement some or all of the functionality of the electronic device. The integrated circuit may include hardware mechanisms, software mechanisms or both that are used for determining angular combinations, generating pixel drive signals or both. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

Figure 10:
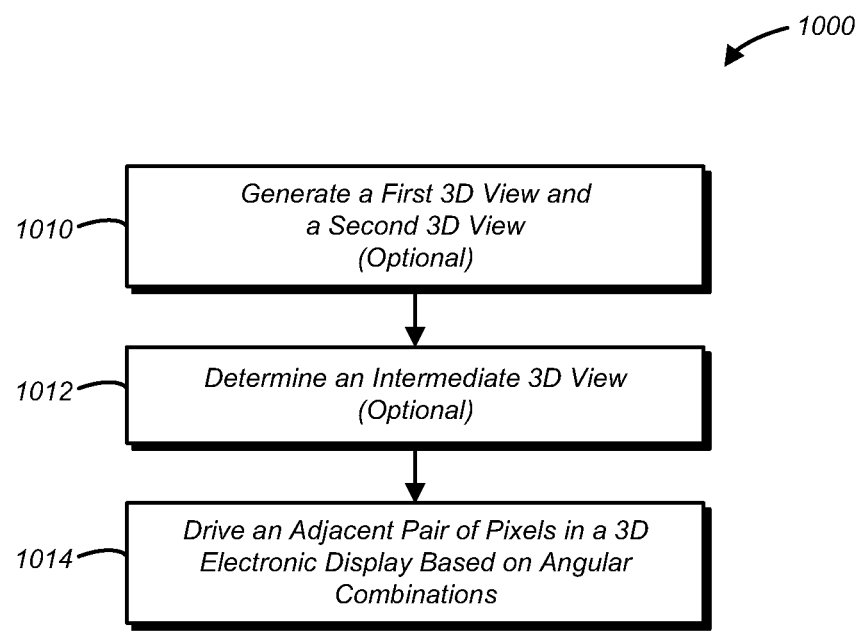
FIG. 10 illustrates a flow chart of a method of providing supersampling in an example, according to an embodiment consistent with the principles described herein.

In accordance with other embodiments of the principles described herein, a method of providing supersampling is provided. FIG. 10 illustrates a flow chart of a method 1000 for providing supersampling in an example, according to an embodiment consistent with the principles described herein. This method may be performed by an electronic device, such as one of the preceding embodiments of the electronic device or a component in one of the preceding embodiments of the electronic device. The method 1000 of providing supersampling comprises driving an adjacent pair of pixels in a 3D electronic display based on angular combinations (operation 1014), where a pixel in the pair of pixels is driven by an angular combination in the angular combinations of a pixel in a 3D view of a 3D image and at least one product of a pixel in an intermediate 3D view and an associated weight. Note that 3D views applied to the pair of pixels have different associated angular ranges with different principal angular directions, and the intermediate 3D view has an associated intermediate angular range with an intermediate principal angular direction that is between the principal angular directions. Moreover, when viewing the 3D electronic display along a principal angular direction in the principal directions of the 3D view, a viewer sees the 3D view, and when viewing the 3D electronic display along the intermediate principal angular direction, the viewer sees the intermediate 3D view.

In some embodiments, the method 1000 of providing supersampling further comprises optionally generating, based on the 3D image, the first 3D view and the second 3D view (operation 1010), and optionally determining, based on the first 3D view and the second 3D view, the intermediate 3D view (operation 1012).

In some embodiments, the intermediate 3D view in the method 1000 may be determined based on the 3D image instead of or in addition to being determined based on the first 3D view and the second 3D view in operation 1012.

Thus, there have been described examples of a supersampling technique that increases the angular resolution of a 3D electronic display without increasing the cost or complexity of the 3D electronic display. The supersampling technique may be implemented by applying, on a pixel-by-pixel basis in the 3D electronic display, angular combinations of pixels in 3D views with corresponding pixels in one or more products of weights and intermediate 3D views. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A display-driver apparatus, comprising a driver circuit configured to:
   drive an adjacent pair of pixels in a three-dimensional (3D) electronic display based on angular combinations, wherein a pixel in the pair of pixels is driven by an angular combination in the angular combinations of a pixel in a 3D view of a 3D image and at least one product of a pixel in an intermediate 3D view and an associated weight,
   wherein 3D views applied to the pair of pixels have different associated angular ranges with different principal angular directions,
   wherein the intermediate 3D view has an associated intermediate angular range with an intermediate principal angular direction that is between the principal angular directions; and
   wherein when viewing the 3D electronic display along a principal angular direction in the principal directions of the 3D view, a viewer sees the 3D view, and when viewing the 3D electronic display along the intermediate principal angular direction, the viewer sees the intermediate 3D view.

2. The display-driver apparatus of claim 1, wherein the angular combinations increase an angular resolution of the 3D electronic display.

3. The display-driver apparatus of claim 2, wherein the 3D view is included in 64 3D views of the 3D image and the angular resolution of the 3D electronic display corresponds to one of: 128 3D views of the 3D image, and 256 3D views of the 3D image.

4. The display-driver apparatus of claim 1, wherein the weights include: one half when the pair of pixels are along a horizontal direction of the 3D electronic display; one half when the pair of pixels are along a vertical direction of the 3D electronic display; and one quarter when the pair of pixels are along a diagonal direction of the 3D electronic display.

5. The display-driver apparatus of claim 1, wherein the intermediate 3D view is along a diagonal direction of the 3D electronic display; and
   wherein the intermediate 3D view is included in the angular combinations that are driven on a group of four adjacent pixels in the 3D electronic display that includes the pair of pixels.

6. The display-driver apparatus of claim 1, wherein the intermediate 3D view is included in the angular combinations that are driven on an adjacent group of pixels in the 3D electronic display that includes the pair of pixels; and
   wherein the angular combinations driven on the group of pixels include intermediate 3D views between the 3D views driven on adjacent pixels along a horizontal direction of the 3D electronic display, a vertical direction of the 3D electronic display and a diagonal direction of the 3D electronic display.

7. The display-driver apparatus of claim 1, further comprising a graphics processor, electrically coupled to the display driver, configured to:
generate, based on the 3D image, a first 3D view and a second 3D view; and
determine, based on the first 3D view and the second 3D view, the intermediate 3D view.

8. The display-driver apparatus of claim 1, wherein the driver circuit includes a graphics processor configured to:
generate, based on the 3D image, a first 3D view and a second 3D view;
determine, based on the first 3D view and the second 3D view, the intermediate 3D view; and
drive a first pixel and a second pixel of the pixel pair.

9. A backlight comprising the display-driver apparatus of claim 1, the backlight further comprising:
a plate light guide configured to guide substantially collimated light at a non-zero propagation angle,
wherein the plate light guide is further configured to emit a portion of the guided collimated light from a surface of the plate light guide; and
a multibeam diffraction grating at the plate light guide surface, the multibeam diffraction grating configured to diffractively couple out a portion of the collimated light from the plate light guide as a plurality of light beams emitted from the plate light guide surface,
wherein a light beam of the light beam plurality has a principal angular direction different from principal angular directions of other light beams of the light beam plurality, and
wherein the principal angular direction of the light beam corresponds to a 3D view direction of the 3D electronic display, and
wherein the light beam represents one of pixels of the 3D electronic display in the 3D view direction.

10. The backlight of claim 9, further comprising a light source, optically coupled to the plate light guide, configured to provide the light to the plate light guide.

11. The backlight of claim 10, wherein the light source comprises a plurality of different optical sources configured to provide different colors of light at different, color-specific, non-zero propagation angles of the collimated light corresponding to each of the different colors of the light.

12. The 3D electronic display comprising the backlight of claim 9, the 3D electronic display further comprising a light valve to modulate the light beam of the light beam plurality, the light valve being adjacent to the multibeam diffraction grating.

13. A three-dimensional (3D) electronic display, comprising:
a driver configured to drive pixels of the 3D electronic display with angular combinations of different 3D views of a 3D image and products of intermediate 3D views of the 3D image and associated weights, wherein the intermediate 3D views are between the different 3D views;
wherein, when viewing the 3D electronic display along a principal angular direction associated with a 3D view in the different 3D views, a viewer sees the 3D view and, when viewing the 3D electronic display along an intermediate principal angular direction associated with an intermediate 3D view in the intermediate 3D views, the viewer sees the intermediate 3D view;
a plate light guide configured to guide collimated light as a guided light beam at a non-zero propagation angle; and
an array of multibeam diffraction gratings at a surface of the plate light guide, a multibeam diffraction grating of the array being configured to diffractively couple out a portion of the guided light beam as a plurality of coupled-out light beams having different principal angular directions corresponding to directions of the different 3D views of the 3D electronic display.

14. The 3D electronic display of claim 13, further comprising a graphics processor, electrically coupled to the driver, configured to:
generate, based on the 3D image, the 3D views; and
determine, based on the 3D views, the intermediate 3D views.

15. The 3D electronic display of claim 13, wherein the array of multibeam diffraction gratings comprises a chirped diffraction grating having curved diffractive features.

16. The 3D electronic display of claim 13, wherein the array of multibeam diffraction gratings comprises a linear chirped diffraction grating.

17. The 3D electronic display of claim 13, further comprising a light valve array configured to selectively modulate the coupled-out light beams as 3D pixels corresponding to the different 3D views of the 3D electronic display.

18. A method of providing supersampling, the method comprising:
driving an adjacent pair of pixels in a three-dimensional (3D) electronic display based on angular combinations, wherein a pixel in the pair of pixels is driven by an angular combination in the angular combinations of a pixel in a 3D view of a 3D image and at least one product of a pixel in an intermediate 3D view and an associated weight,
wherein 3D views applied to the pair of pixels have different associated angular ranges with different principal angular directions,
wherein the intermediate 3D view has an associated intermediate angular range with an intermediate principal angular direction that is between the principal angular directions; and
wherein when viewing the 3D electronic display along a principal angular direction in the principal directions of the 3D view, a viewer sees the 3D view, and when viewing the 3D electronic display along the intermediate principal angular direction, the viewer sees the intermediate 3D view.

19. The method of claim 18, wherein the method further comprises:
generating, based on the 3D image, a first 3D view and a second 3D view; and
determining, based on the first 3D view and the second 3D view, the intermediate 3D view.

20. The method of claim 18, wherein the angular combinations increase an angular resolution of the 3D electronic display.

21. A computer-program product for use in conjunction with a driver circuit, the computer-program product comprising a non-transitory computer-readable storage medium and a computer-program mechanism embedded therein to provide super resolution, the computer-program mechanism including:
instructions for driving an adjacent pair of pixels in a three-dimensional (3D) electronic display based on angular combinations, wherein a pixel in the pair of pixels is driven by an angular combination in the angular combinations of a pixel in a 3D view of a 3D image and at least one product of a pixel in an intermediate 3D view and an associated weight, wherein 3D views applied to the pair of pixels have different associated angular ranges with different principal angular directions, wherein the intermediate 3D view has an associated intermediate angular range with an intermediate principal angular direction that is between the principal angular directions; and wherein when viewing the 3D electronic display along a principal angular direction in the principal directions of the 3D view, a viewer sees the 3D view, and when viewing the 3D electronic display along the intermediate principal angular direction, the viewer sees the intermediate 3D view.

* * * * *